(12) United States Patent
Park et al.

(10) Patent No.: US 12,519,318 B2
(45) Date of Patent: Jan. 6, 2026

(54) METHOD AND APPARATUS FOR COOPERATIVELY CONTROLLING POWER BASED ON POWER SENSITIVITY

(71) Applicant: UIF (University Industry Foundation), Yonsei University, Seoul (KR)

(72) Inventors: Jung-Wook Park, Seoul (KR); Kipo Yoon, Seoul (KR)

(73) Assignee: UIF (University Industry Foundation), Yonsei University, Seoul (KR)

(*) Notice: Subject to any disclaimer, the term of this patent is extended or adjusted under 35 U.S.C. 154(b) by 451 days.

(21) Appl. No.: 18/070,471

(22) Filed: Nov. 29, 2022

(65) Prior Publication Data

US 2024/0030719 A1    Jan. 25, 2024

(30) Foreign Application Priority Data

Jul. 20, 2022    (KR) .................. 10-2022-0089337

(51) Int. Cl.
*H02J 3/46*    (2006.01)
*H02J 3/00*    (2006.01)
*H02J 3/38*    (2006.01)

(52) U.S. Cl.
CPC ............ *H02J 3/46* (2013.01); *H02J 3/003* (2020.01); *H02J 3/381* (2013.01); *H02J 2300/20* (2020.01)

(58) Field of Classification Search
CPC .... H02J 3/46; H02J 3/003; H02J 3/381; H02J 2300/20
See application file for complete search history.

(56) References Cited

U.S. PATENT DOCUMENTS

| | | | |
|---|---|---|---|
| 6,836,737 B2 * | 12/2004 | Petite | H04L 43/00 |
| | | | 702/62 |
| 2002/0190576 A1 * | 12/2002 | Kern | H02J 13/00002 |
| | | | 307/18 |

(Continued)

FOREIGN PATENT DOCUMENTS

| | | |
|---|---|---|
| KR | 10-2016-0092244 A | 8/2016 |
| KR | 10-2019-0040543 A | 4/2019 |

OTHER PUBLICATIONS

Ali Mohammadi, et al., 'Diagonal quadratic approximation for decentralized collaborative TSO+DSO optimal power flow', DOI 10.1109/TSG.2018.2796034, IEEE, Jan. 29, 2018, 12 pages.

(Continued)

*Primary Examiner* — Scott T Baderman
*Assistant Examiner* — Mario M Velez-Lopez
(74) *Attorney, Agent, or Firm* — Park, Kim & Suh, LLC (57) ABSTRACT

Disclosed is a method of cooperatively controlling power based on power sensitivity that is executed by at least one processor including obtaining a first power sensitivity parameter based on a power generation change amount of a distribution grid to a magnitude change amount of an arbitrary load, receiving a feasible operation region (FOR) of the distribution grid from a distribution grid operator corresponding to the distribution grid including a plurality of generators, determining final reference power of the distribution grid based on the first power sensitivity parameter and the FOR, and transmitting the final reference power to the distribution grid operator.

6 Claims, 9 Drawing Sheets

(56) References Cited

U.S. PATENT DOCUMENTS

| | | | |
|---|---|---|---|
| 2014/0212410 A1* | 7/2014 | Maltzman | A61K 39/39541 424/133.1 |
| 2019/0157876 A1* | 5/2019 | Dobrowolski | H02J 3/466 |
| 2019/0326755 A1* | 10/2019 | Fu | H02J 13/00002 |
| 2020/0373759 A1 | 11/2020 | Samaan et al. | |
| 2020/0403413 A1* | 12/2020 | Premm | H02J 3/16 |
| 2021/0013720 A1* | 1/2021 | Zhou | H02J 3/381 |
| 2022/0229459 A1* | 7/2022 | Liu | G06Q 50/06 |

OTHER PUBLICATIONS

Fatemeh Najibi, et al., 'TSO-DSO Coordination Schemes to Facilitate Distributed Resources Integration', https://doi.org/10.3390/su13147832, Jul. 13, 2021, 29 pages.

\* cited by examiner

METHOD AND APPARATUS FOR COOPERATIVELY CONTROLLING POWER BASED ON POWER SENSITIVITY

CROSS-REFERENCE TO RELATED APPLICATIONS

This application claims priority to Korean Patent Application 10-2022-0089337, filed on Jul. 20, 2022, in the Korean Intellectual Property Office, the disclosures of which is incorporated herein by reference in its entirety.

BACKGROUND

Embodiments of the present disclosure described herein relate to a method and apparatus for cooperatively controlling power based on power sensitivity. The method and apparatus of the present disclosure refer to a technology developed through Leader Researcher Support Project "Energy Conversion Power Grid Research Center (3/3, STAGE 1; 2022 Mar. 1~2023 Feb. 28)" of the National Research Foundation of the Ministry of Science and ICT.

In a conventional general power grid system, a transmission grid operator and a distribution grid operator have operated the power grid without any information about each other. However, as the impact of distribution grid operators on transmission grid operators increases with the increasing penetration of renewable energy, it is difficult to expect the effectiveness of a power-flow analysis model according to the conventional method. However, sharing sensitive data with each other for close interaction between a transmission grid operator and a distribution grid operator may be susceptible. In addition, the amount of computation for power-flow analysis may be significantly increased even when the counterpart's data is used. Accordingly, it is not easy to allocate optimal power to a generator by using only a conventional method.

SUMMARY

Embodiments of the present disclosure provide a method and apparatus for cooperatively controlling power based on power sensitivity without sharing sensitive data with each other based on the power sensitivity of each of the transmission grid operator and distribution grid operator.

According to an embodiment, a method of cooperatively controlling power based on power sensitivity that is executed by at least one processor includes obtaining a first power sensitivity parameter based on a power generation change amount of a distribution grid to a magnitude change amount of an arbitrary load, receiving a feasible operation region (FOR) of the distribution grid from a distribution grid operator corresponding to the distribution grid including a plurality of generators, determining final reference power of the distribution grid based on the first power sensitivity parameter and the FOR, and transmitting the final reference power to the distribution grid operator.

According to an embodiment, the determining of the final reference power of the distribution grid based on the first power sensitivity parameter and the FOR may include calculating reference power of the distribution grid by using the first power sensitivity parameter in a boundary bus of the distribution grid, and determining the final reference power of the distribution grid by comparing the FOR with the reference power.

According to an embodiment, the determining of the final reference power of the distribution grid by comparing the FOR and the reference power may include determining that the reference power is the final reference power of the distribution grid when the reference power is located on the boundary of the FOR or within the boundary of the FOR.

According to an embodiment, the determining of the final reference power of the distribution grid by comparing the FOR and the reference power may include determining a point, which minimizes a distance to the reference power, from among a plurality of points on the boundary of the FOR as the final reference power when the reference power is located outside the boundary of the FOR.

According to an embodiment, the distribution grid operator may determine a power generation amount of each of the plurality of generators based on a second power sensitivity parameter and the final reference power.

According to an embodiment, the second power sensitivity parameter may be based on a power generation change amount of each of the plurality of generators to a magnitude change amount of an arbitrary load.

According to an embodiment, a computer-readable non-transitory recording medium storing a program for executing a method of cooperatively controlling power based on power sensitivity.

According to an embodiment, an apparatus for cooperatively controlling power based on power sensitivity includes a memory that stores at least one of a first power sensitivity parameter that is based on a power generation change amount of a distribution grid to a magnitude change amount of an arbitrary load, FOR of the distribution grid including a plurality of generators, and final reference power of the distribution grid, a communication module that receives the FOR from a distribution grid operator corresponding to the distribution grid and transmits the final reference power to the distribution grid, and at least one processor connected to the memory and executing computer-readable instructions stored in the memory. The instructions causes the processor to obtain the first power sensitivity parameter, to receive the FOR from the distribution grid operator, to determine the final reference power of the distribution grid based on the first power sensitivity parameter and the FOR, and to transmit the final reference power to the distribution grid operator.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, details for implementing the present disclosure will be described in detail with reference to the accompanying drawings. However, in the following description, when there is a risk of unnecessarily obscuring the gist of the present disclosure, detailed descriptions of well-known functions or configurations will be omitted.

In the accompanying drawings, identical or corresponding components are assigned the same reference numerals. Moreover, in the description of embodiments below, descriptions of the same or corresponding components may be omitted to avoid redundancy. However, even though descriptions regarding components are omitted, it is not intended that such components are not included in any embodiment.

The above and other aspects, features and advantages of the present disclosure will become apparent from embodiments to be described in conjunction with the accompanying drawings. However, the present disclosure may be embodied in various different forms, and should not be construed as being limited only to the illustrated embodiments. Rather, these embodiments are provided as examples such that the present disclosure will be thorough and complete, and will fully convey the scope of the present disclosure to those skilled in the art.

Terms used in this specification will be briefly described, and the disclosed embodiments will be described in detail. Although certain general terms widely used in this specification are selected to describe embodiments in consideration of the functions thereof, these general terms may vary according to intentions of one of ordinary skill in the art, case precedents, the advent of new technologies, and the like. Terms arbitrarily selected by the applicant of the embodiments may also be used in a specific case. In this case, their meanings are given in the detailed description of the present disclosure. Hence, these terms used in the present disclosure may be defined based on their meanings and the contents of the present disclosure, not by simply stating the terms.

Expressions in the singular used in this specification include a plurality of expressions unless interpreted otherwise in context. A plurality of expressions includes expressions in the singular unless the context clearly dictates that the expression is plural. It will be understood that the terms "comprises," "comprising," "includes" and/or "including," when used herein, specify the presence of stated elements and/or components, but do not preclude the presence or addition of one or more other elements and/or components.

According to an embodiment of the present disclosure, a 'memory' needs to be broadly interpreted to include any electronic component capable of storing electronic information. The 'memory' may refer to various types of processor-readable media such as a random access memory (RAM), a read-only memory (ROM), a non-volatile random access memory (NVRAM), a programmable read-only memory (PROM), an erasable-programmable read-only memory (EPROM), an electrically erasable PROM (EEPROM), a flash memory, a magnetic or optical data storage device, a register, and the like. As long as a processor is capable of reading out information from and/or writing information to memory, it is referred to as a "state where the memory communicates with the processor in a wired or wireless manner".

According to an embodiment of the present disclosure, an 'operator' and an 'operating device' may be interpreted as the same meaning. That is, a 'transmission grid operator' may be interpreted as a 'transmission grid operating device'. Moreover, a 'distribution grid operator' may be interpreted as a 'distribution grid operating device'.

Figure 1:
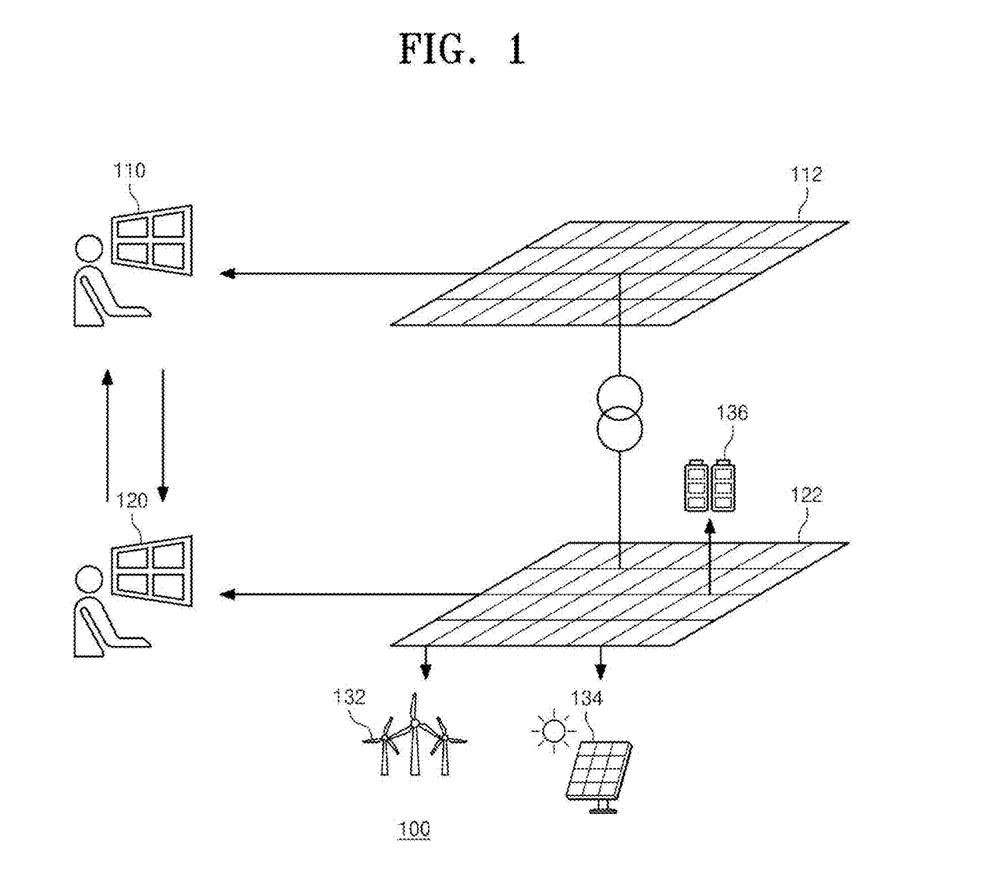
FIG. 1 is a schematic diagram showing a power system 100, according to an embodiment of the present disclosure.

FIG. 1 is a schematic diagram showing a power system 100, according to an embodiment of the present disclosure. The power system 100 may refer to a system including a network connected between a power producer to a power consumer for the purpose of supplying electricity from the power producer to the power consumer, and a manager who manages the corresponding network. As shown in drawings, the power system 100 may include a transmission grid operator 110, a transmission grid 112, a distribution grid operator 120, a distribution grid 122, and at least one of a plurality of generators 132 to 136. Here, the transmission grid operator 110 and the distribution grid operator 120 may be configured as an independent system and/or device.

The transmission grid operator 110 may manage the transmission grid 112. In detail, the transmission grid operator 110 may transmit/receive data for determining a power generation amount of each of the plurality of generators 132 to 136. Furthermore, the transmission grid operator 110 may generate new data for determining a power generation amount of each of the plurality of generators 132 to 136, based on data received from the transmission grid 112 and/or the distribution grid operator 120.

The distribution grid operator 120 may manage the distribution grid 122. In detail, the distribution grid operator 120 may transmit/receive data for determining a power generation amount of each of the plurality of generators 132 to 136. Besides, the distribution grid operator 120 may generate new data for determining the power generation amount of each of the plurality of generators 132 to 136, based on data received from the distribution grid 122 and/or the transmission grid operator 110.

The transmission grid operator 110 and/or the distribution grid operator 120 may independently collect and/or generate data for determining the power generation amount of each of the plurality of generators 132 to 136. For example, the transmission grid operator 110 may collect data from the transmission grid 112 and may generate new data based on the collected data. As another example, the distribution grid operator 120 may collect data from the distribution grid 122 and may generate new data based on the collected data.

Data of each of the transmission grid operator 110 and the distribution grid operator 120 may be required to determine the power generation amount of each of the plurality of generators 132 to 136. However, when the requested data includes sensitive information, it is very difficult to share the data with each other. According to an embodiment of the present disclosure, to solve this issue, it is possible to provide a method and apparatus for cooperatively controlling power based on power sensitivity that are capable of calculating the power generation amount of each of the plurality of generators 132 to 136 without exposing sensitive information of the transmission grid operator 110 and/or the distribution grid operator 120. In particular, when each of the plurality of generators 132 to 136 generates renewable energy, such as solar power, wind power, hydro power, or the like, problems such as generation mismatch and/or power mismatch that occurs in the plurality of generators 132 to 136 of the power system 100 it may be solved.

Figure 4:
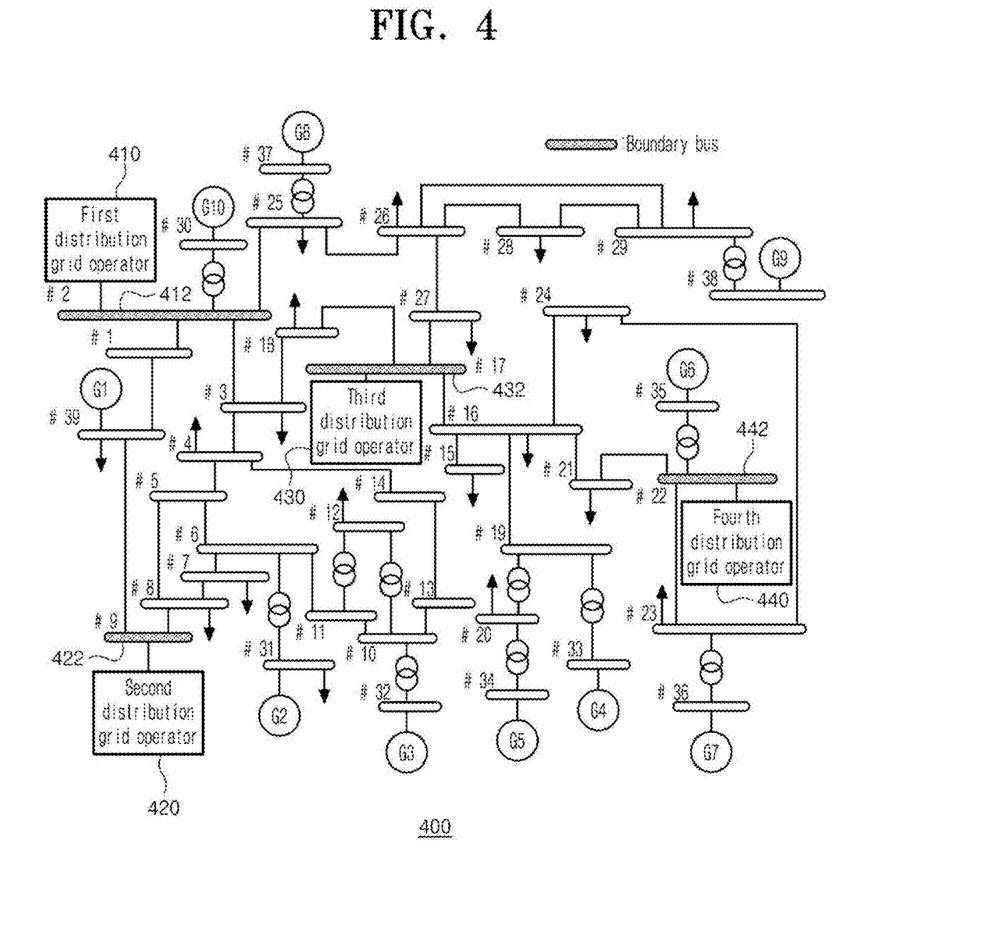
FIG. 4 is a schematic diagram illustrating a transmission grid, according to an embodiment of the present disclosure.

In the meantime, FIG. 1 illustrates that the transmission grid 112 and the distribution grid 122 are two separate networks. However, the transmission grid 112 and the distribution grid 122 may be included in one network while being connected to each other. In the present disclosure, a network including the transmission grid 112 and the distribution grid 122 is defined as a 'power grid'. An example of such a power grid is shown in FIG. 4.

Figure 2:
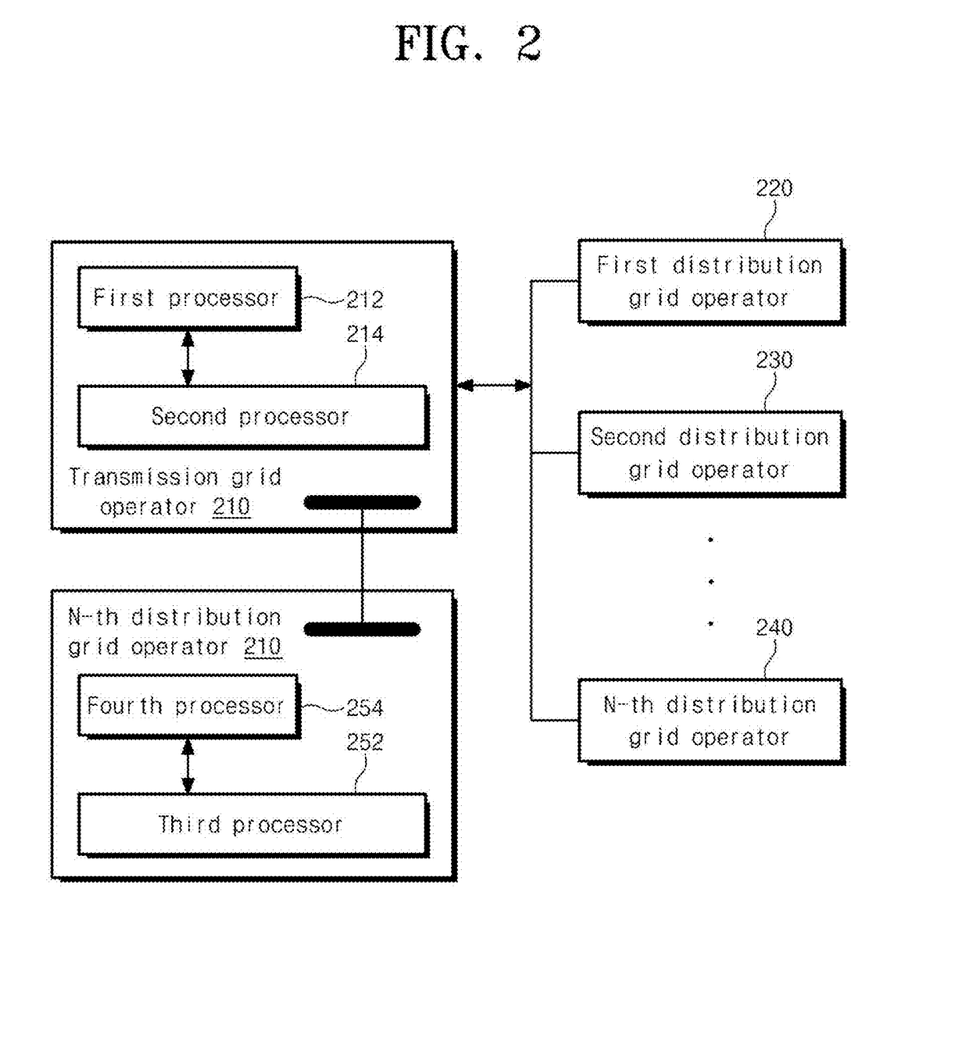
FIG. 2 is a block diagram illustrating a configuration of a transmission grid operator and a plurality of distribution grid operators, according to an embodiment of the present disclosure.

FIG. 2 is a block diagram illustrating a configuration of a transmission grid operator 210 and a plurality of distribution grid operators 220 to 240, according to an embodiment of the present disclosure. As shown, the one transmission grid operator 210 may be connected to the plurality of distribution grid operators 220 to 240. Furthermore, the transmission grid operator 210 or each of the plurality of distribution grid operators 220 to 240 may include at least one processor.

The transmission grid operator 210 may include a first processor 212 and/or a second processor 214, which is configured to determine the power generation amount of each of a plurality of distribution grid operators 220 to 240. Moreover, the transmission grid operator 210 may include the first processor 212 and/or the second processor 214, which is configured to determine the power generation amount of each of a plurality of generators (e.g., the plurality of generators 132 to 136).

The first processor 212 may refer to a processor configured to analyze a power flow of a power grid. For example, the first processor 212 may calculate a first power sensitivity parameter based on the power change amount of each of a plurality of distribution grids with respect to the magnitude change amount of an arbitrary load distributed to a power grid. As such, the first power sensitivity parameter may be defined according to Equation 1. Here, 'm' denotes the number of buses of each of a plurality of generators. 'n' denotes the total number of buses in a power grid. In addition, $P_{iG}$ and $Q_{iG}$ denote active power and reactive power provided from the bus of a generator (No. i), respectively. Also, $P_{iL}$ and $Q_{iL}$ denote an active load and a reactive load associated with a bus (No. i), respectively. $P_i$ and $Q_i$ denote active power and reactive power of a load (or a voltage-controlled bus), respectively.

$$\begin{bmatrix} \Delta P_{2G} \\ \vdots \\ \Delta P_{mG} \\ \Delta Q_{2G} \\ \vdots \\ \Delta Q_{mG} \end{bmatrix} = -[K^{sq}]^{-1} \cdot K^{row} \cdot \begin{bmatrix} -\Delta P_{2L} \\ \vdots \\ -\Delta P_{mL} \\ \Delta P_n \\ -\Delta Q_{2L} \\ \vdots \\ -\Delta Q_{mL} \\ \Delta Q_n \end{bmatrix} \quad \text{[Equation 1]}$$

A power sensitivity parameter may be calculated according to Equation 2. Here, $K^{sq}$ and $K^{row}$ denote a submatrix of 2(m−1)*2(n−1) of K and a submatrix of 2(m−1)*2(m−1) of K, respectively. Also, 'K' is an inverse matrix of Jacobian matrix, and represents a linear relationship between a phase angle and a magnitude in a bus for a change in active power and reactive power.

$$S = \begin{bmatrix} S^{11} & S^{12} \\ S^{21} & S^{22} \end{bmatrix} = -[K^{sq}]^{-1} \cdot K^{row} \quad \text{[Equation 2]}$$

In Equation 2, $S^{11}$, $S^{12}$, $S^{21}$, and $S^{22}$ represent submatrices of (m−1)*(n−1) of 'S'. The transmission grid operator may calculate a generation-load power sensitivity parameter (of a distribution grid) by using Equation 1 and Equation 2, and is indicated as a first power sensitivity parameter of the present disclosure. As in the above description, the distribution grid operator may calculate a generation-load power sensitivity parameter (of a generator) by using Equation 1 and Equation 2, and is indicated as a second power sensitivity parameter of the present disclosure.

Meanwhile, a plurality of distribution grids may correspond to a plurality of distribution grid operators 220 to 240, respectively. That is, the plurality of distribution grids may refer to distribution grids managed by a plurality of distribution grid operators 220 to 240, respectively.

The second processor 214 may obtain the first power sensitivity parameter calculated by the first processor 212. Also, the second processor 214 may obtain a feasible operation region (FOR) from at least one of a plurality of distribution grid operators 220 to 240. Here, the FOR may be calculated by the distribution grid operator based on data (e.g., flexibility) obtained from generator(s) included in a distribution grid. For example, the FOR may be determined by the distribution grid operator as a union region of the flexibility of each of generators included in the distribution grid.

The second processor 214 may calculate reference power of the distribution grid by using the first sensitivity parameter. Here, the reference power may represent the power amount of the distribution grid directly calculated by the transmission grid operator without data of the distribution grid operator. The reference power may be calculated according to Equation 3. Here, $P_{T,G}$ and $Q_{T,G}$ represent active power and reactive power on a bus of a transmission grid, respectively. $P_{T,L}$ and $Q_{T,L}$ represent an active load and a reactive load on the bus of the transmission grid, respectively. Furthermore, $P_B$ and $Q_B$ represent active power and reactive power on a boundary bus of a distribution grid. Meanwhile, Equation 3 is based on Equation 1.

$$\begin{bmatrix} \Delta P_{T,G} \\ \Delta P_B \\ \Delta Q_{T,G} \\ \Delta Q_B \end{bmatrix} = S_{TSO} \cdot \begin{bmatrix} \Delta P_{T,L} \\ \Delta Q_{T,L} \end{bmatrix} \quad \text{[Equation 3]}$$

The second processor 214 may determine final reference power for the distribution grid based on the first power sensitivity parameter (or the reference power) and FOR. In detail, the second processor 214 may determine the final reference power of the distribution grid depending on a relative location of the reference power with respect to the FOR. This will be described with reference to FIG. 6.

The second processor 214 may transmit the final reference power to the plurality of distribution grid operators 220 to 240. Moreover, the N-th distribution grid operator 240 may include a third processor 252 and/or a fourth processor 254, which is configured to determine the power generation amount of each of a plurality of generators (e.g., the plurality of generators 132 to 136). Here, the plurality of generators may refer to generator(s) managed by the N-th distribution grid operator 240.

The third processor 252 may refer to a processor configured to analyze a power flow of a power grid. For example, the third processor 252 may calculate a second power sensitivity parameter based on the power change amount of each of the plurality of generators with respect to the magnitude change amount of an arbitrary load distributed to the power grid. Here, the plurality of generators may refer to generator(s) associated with the N-th distribution grid operator 240.

The fourth processor 254 may obtain the second power sensitivity parameter calculated by the third processor 252. In addition, the fourth processor 254 may obtain the flexibility of each of the plurality of generators. Then, the fourth processor 254 may determine the final power generation amount for a generator based on the second power sensitivity parameter and flexibility. In the meantime, the fourth processor 254 may determine the FOR of the N-th distribution grid operator 240 by collecting the obtained flexibility of each of a plurality of generators, and may transmit the determined FOR to the transmission grid operator 210.

Figure 3:
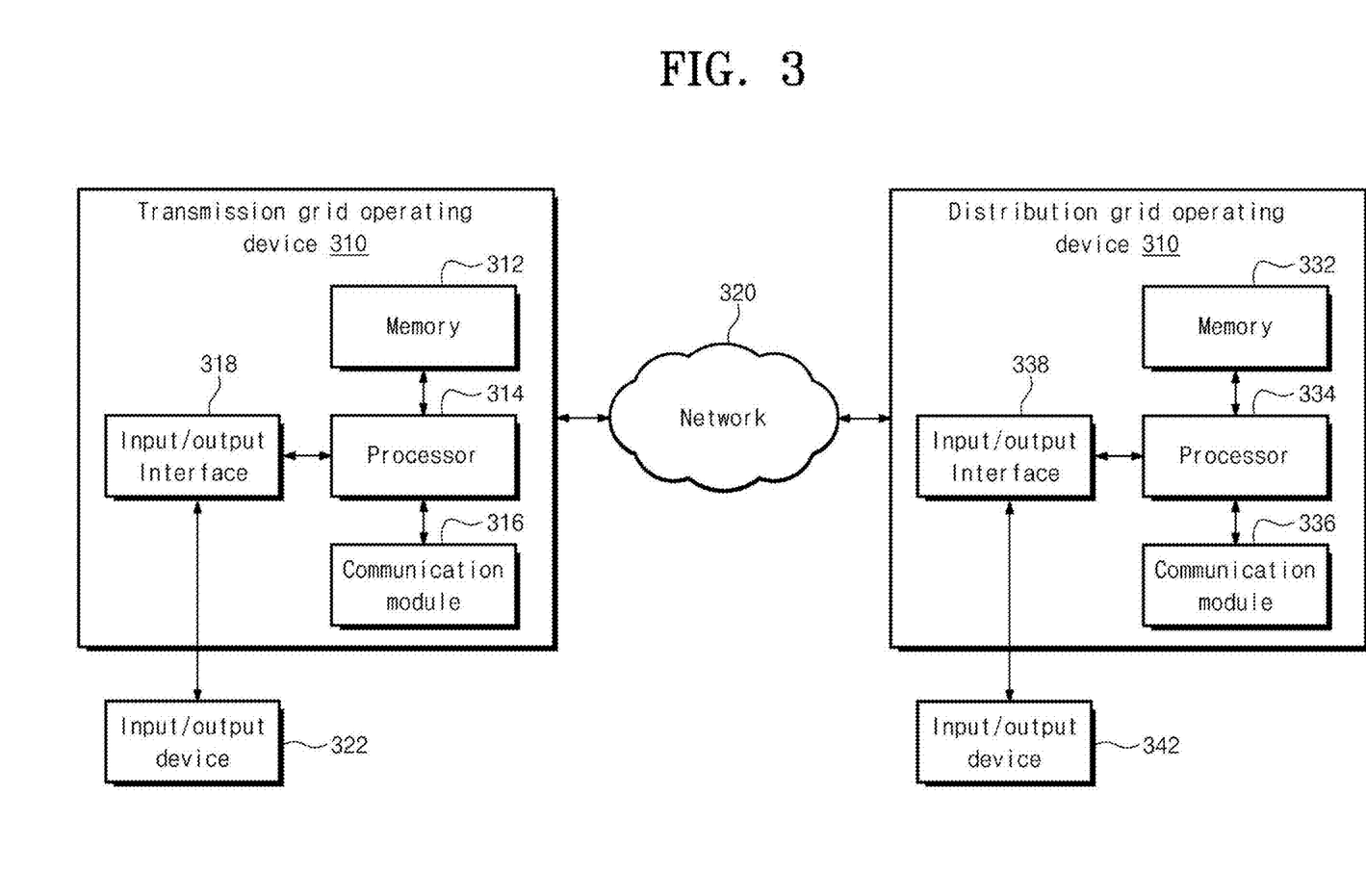
FIG. 3 is a block diagram illustrating an internal configuration of a transmission grid operating device and a distribution grid operating device, according to an embodiment of the present disclosure.

FIG. 3 is a block diagram illustrating an internal configuration of a transmission grid operating device 310 and a distribution grid operating device 330, according to an embodiment of the present disclosure. The transmission grid operating device 310 may refer to any computing device capable of executing a program for controlling the amount (i.e., final reference power) of power allocated to the one or more distribution grid operating devices 330 and capable of wired/wireless communication. As shown, the transmission grid operating device 310 may include a memory 312, a processor 314, a communication module 316, and an input/output interface 318. Furthermore, the distribution grid operating device 330 may refer to any computing capable of executing a program for controlling the amount (i.e., final reference power) of power allocated to each of a plurality of generators distributed to a corresponding distribution grid and capable of wired/wireless communication. The distribution grid operating device 330 may include a memory 332, a processor 334, a communication module 336, and an input/output interface 338. As shown in FIG. 3, the transmission grid operating device 310 and the distribution grid operating device 330 may be configured to exchange information and/or data through a network 320 by using the communication modules 316 and 336, respectively. Moreover, an input/output device 322 may be configured to input information and/or data to the transmission grid operating device 310 through the input/output interface 318 or to output information and/or data generated from the transmission grid operating device 310.

The memory 312 or 332 may include any computer-readable non-transitory recording medium. According to an embodiment, the memory 312 or 332 may include permanent mass storage devices such as a random access memory (RAM), a read only memory (ROM), a disk drive, a solid state drive (SSD), a flash memory, and the like. As another example, the permanent mass storage device such as ROM, SSD, flash memory, or disk drive may be included in the transmission grid operating device 310 or the distribution grid operating device 330 as a permanent storage device separate from the memory. In addition, the memories 312 and 332 may store an operating system and at least one program code (e.g., a code which is used to control the amount of power (i.e., final reference power) allocated to the distribution grid operating device 330 and which is installed and driven in the transmission grid operating device 310).

These software components may be loaded from a computer-readable non-transitory recording medium, which is independent of the memories 312 and 332. Such the separate computer-readable non-transitory recording medium may include a recording medium capable of being directly connected to the transmission grid operating device 310 and the distribution grid operating device 330, and may include, for example, a computer-readable non-transitory recording medium such as a floppy drive, a disk, a tape, a DVD/CD-ROM drive, and a memory card. As another example, the software components may be respectively loaded into the memories 312 and 332 through the communication modules 316 and 336, not the computer-readable non-transitory recording medium. For example, at least one program may be loaded into each of the memories 312 and 332 based on a computer program installed by files provided by developers or a file distribution system, which distributes a file for installing an application, through the network 320.

Each of the processors 314 and 334 may be configured to process an instruction of a computer program by performing basic arithmetic, logic, and input and output operations. The instruction may be provided to the processor 314 by the memory 312 or the communication module 316. The instruction may be provided to the processor 334 by the memory 332 or the communication module 336. For example, each of the processor 314 and 334 may be configured to execute instructions received depending on a program code stored in a recording device such as the memories 312 and 332.

The communication module 316 or 336 may provide a configuration or function that allows the transmission grid operating device 310 and the distribution grid operating device 330 to communicate with each other through the network 320. The transmission grid operating device 310 and/or the distribution grid operating device 330 may provide a configuration or function for communicating with another user terminal or another system (e.g., a separate cloud system, etc.). For example, under the control of the communication module 316, a request (e.g., a FOR transfer request, etc.) or data (e.g., final reference power) generated by the processor 314 of the transmission grid operating device 310 depending on a program code stored in a recording device such as the memory 312 may be delivered to the distribution grid operating device 330 through the network 320. Inversely, a control signal or command provided under the control of the processor 334 of the distribution grid operating device 330 may be received by the transmission grid operating device 310 through the communication module 316 of the transmission grid operating device 310 via the communication module 336 and the network 320.

The input/output interfaces 318 and 338 may be means for interaction with the input/output devices 322 and 342, respectively. In detail, the input/output devices 322 and 342 may include an input device such as a camera including an audio sensor and/or an image sensor, a keyboard, a microphone, and a mouse. Additionally, the input/output devices 322 and 342 may include an output device such as a display, a speaker, a haptic feedback device, and the like. As another example, the input/output interfaces 318 and 338 may be means for an interface with a device, in which configurations or functions for performing an input and an output are integrated into one, such as a touch screen.

The transmission grid operating device 310 and the distribution grid operating device 330 may include more components than those of FIG. 3. However, there is no need to clearly illustrate most conventional components. According to an embodiment, the transmission grid operating device 310 may be implemented to include at least part of the input/output device 322 described above. In addition, the transmission grid operating device 310 may further include other components such as a transceiver, a global positioning system (GPS) module, a camera, various sensors, and a database.

According to an embodiment, the processor 314 of the transmission grid operating device 310 may be configured to operate a program for controlling an amount of power (i.e., final reference power) allocated to the one or more distribution grid operating devices 330. In this case, a code associated with the corresponding program may be loaded into the memory 312 of the transmission grid operating device 310. While a program is operating, the processor 314 of the transmission grid operating device 310 may receive information and/or data provided from the input/output device 322 through the input/output interface 318 or receive information and/or data from the distribution grid operating device 330 through the communication module 316 and may process the received information and/or data to store the processed result in the memory 312. Moreover, such the information and/or data may be provided to the distribution grid operating device 330 through the communication module 316.

While a program for controlling the amount of power (i.e., final reference power) allocated to the one or more distribution grid operating devices 330 of the transmission grid operating device 310 is operating, the processor 314 may store data for controlling power input or selected through the input/output device 322 connected to the input/output interface 318 in the memory 312 or may provide the data to the distribution grid operating device 330 through the communication module 316 and the network 320. Additionally or alternatively, the processor 314 may receive data related to power control through the distribution grid operating device 330 connected through the network 320, may store the received data in the memory 312, or may provide the data to the distribution grid operating device 330 through the communication module 316 and the network 320.

The processor 334 of the distribution grid operating device 330 may be configured to manage, process, and/or store information and/or data received from a plurality of user terminals and/or a plurality of external systems. According to an embodiment, the processor 334 may manage, process, and/or store a user input, which is received from the transmission grid operating device 310, and data according to the user input.

FIG. 4 is a schematic diagram illustrating a transmission grid 400, according to an embodiment of the present disclosure. As shown in drawings, the transmission grid 400 may include a plurality of buses, a plurality of generators, and a plurality of loads. Moreover, the transmission grid 400 may be associated with a plurality of distribution grid operators 410, 420, 430, and 440. That is, the transmission grid operator may be connected to the plurality of distribution grid operators 410, 420, 430, and 440 as shown in FIG. 2.

The transmission grid 400 of FIG. 4 is an example of an IEEE 39-bus test system. As such, the transmission grid 400 may include 39 buses (here, #1 to #39), 10 generators (here, G1 to G10), and 19 loads (here, ↓) Referring to FIG. 4, the plurality of distribution grid operators 410, 420, 430, and 440 are connected to boundary buses #2, #9, #17 and #22. In addition, the plurality of distribution grid operators 410, 420, 430, and 440 is connected to 33 buses, 3 generators, and 32 loads.

Figure 5:
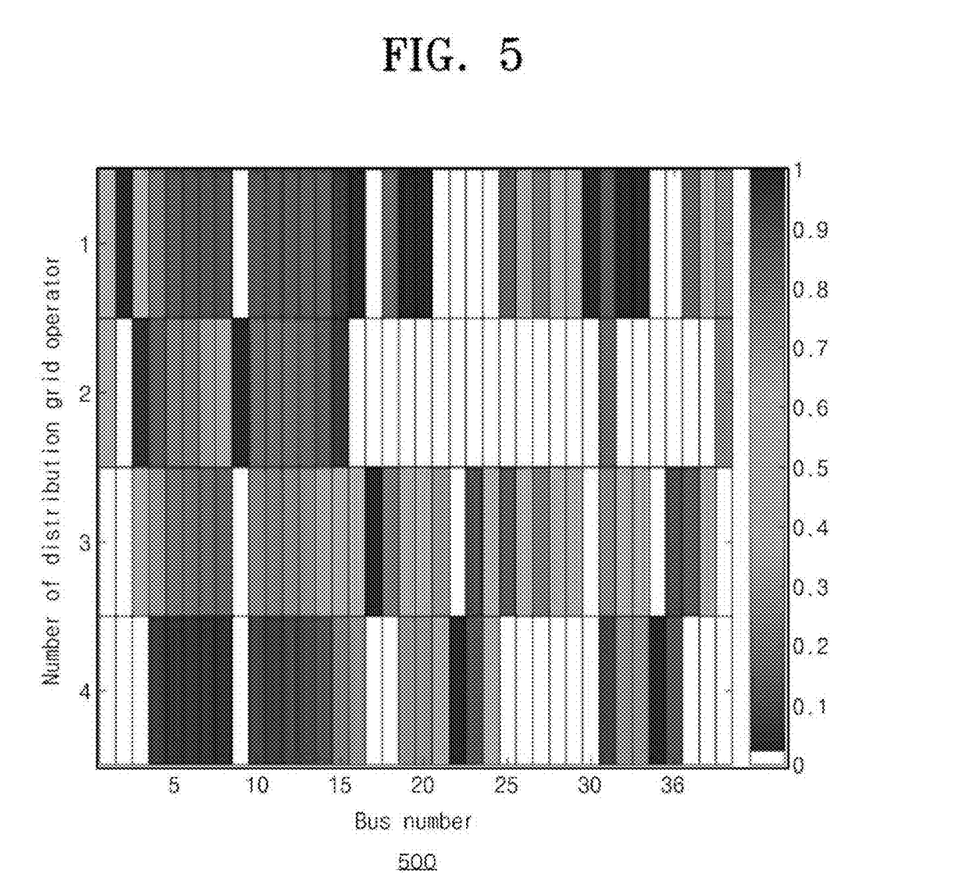
FIG. 5 illustrates an example of a power sensitivity heat map, according to an embodiment of the present disclosure.

FIG. 5 illustrates an example of a power sensitivity heat map 500, according to an embodiment of the present disclosure. As described above, a transmission grid operator (e.g., the transmission grid operator 210) may calculate a first power sensitivity parameter required to determine the power generation amount of each of a plurality of distribution grids. In this case, the transmission grid operator may calculate the first power sensitivity parameter based on the power sensitivity heat map 500. That is, the transmission grid operator may obtain information about an electrical relative distance to a distribution grid operator based on the power sensitivity heat map 500.

Referring to FIG. 5, buses having high actual power sensitivity are most distributed in a distribution grid operator (No. 3). That is, the distribution grid operator (No. 3) has the closest electrical distance to a transmission grid. On the other hand, buses having high power sensitivity are not distributed in a distribution grid operator (No. 2) other than a bus (No. 9). That is, the electrical distance between the distribution grid operator (No. 2) and the transmission grid is relatively long. As such, the transmission grid operator may obtain information about the electrical relative distance to each of a plurality of distribution grid operators based on the power sensitivity heat map 500 and may calculate the first power sensitivity parameter based on the obtained information.

In the meantime, the distribution grid operator may also calculate the second power sensitivity parameter based on a heat map (not shown). In this case, horizontal and vertical axes of the heat map may represent a bus number and the number of a generator, respectively. Here, the second power sensitivity parameter represents a power generation change amount of a generator according to a magnitude change amount of a load included in a power grid. Then, the distribution grid operator may determine the power generation amount of each of a plurality of generators by using the second power sensitivity parameter and the final reference power. This will be described with reference to FIG. 6.

Figure 6:
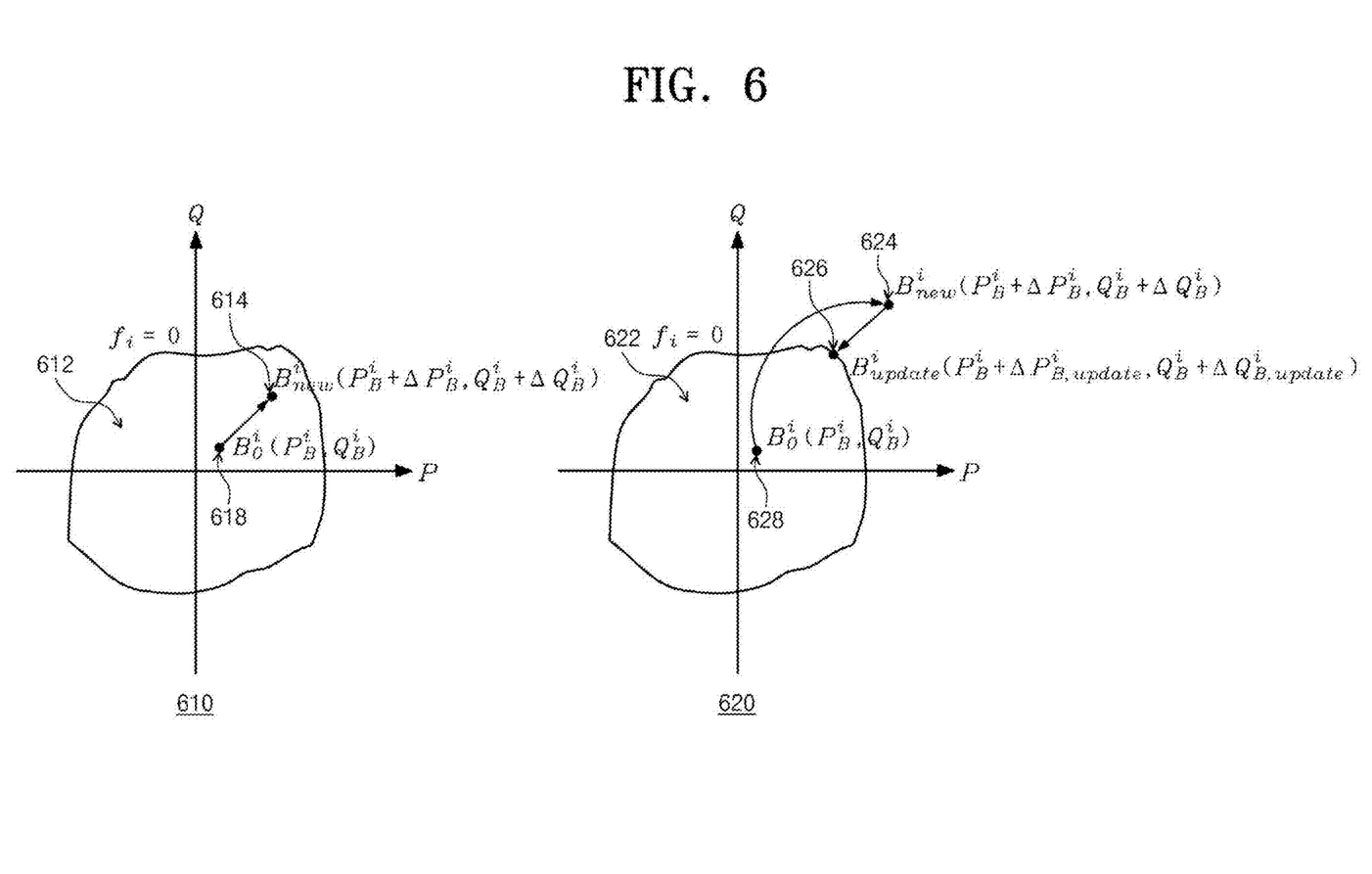
FIG. 6 illustrates that a transmission grid operator determines final reference power, according to an embodiment of the present disclosure.

FIG. 6 illustrates that a transmission grid operator determines final reference power, according to an embodiment of the present disclosure. As described above, a transmission grid operator may obtain a first power sensitivity parameter based on a power sensitivity heat map (e.g., the power sensitivity heat map 500). Then, the transmission grid operator may calculate reference power 614 or 624 of a distribution grid by using the first power sensitivity parameter. Here, the reference power 614 or 624 may indicate a power generation amount of the distribution grid directly predicted by the transmission grid operator without data received from the distribution grid. That is, for the transmission grid operator and a distribution grid operator to cooperatively control power, the calculated reference power 614 or 624 needs to be maintained and/or modified by data (here, the FOR 612 or 622) of the distribution grid operator.

The transmission grid operator may receive the FOR 612 or 622 of the distribution grid from the distribution grid operator. Here, the FOR 612 or 622 may indicate the range of active power (P) and the range of reactive power (Q) that are operated by the distribution grid. Then, the transmission grid operator may determine the final reference power of the distribution grid by comparing the FOR 612 and 622 and the reference power 614 and 624.

In the meantime, before determining the final reference power, it may be assumed that a distribution grid operator (No. i) has FOR whose boundary is approximated by "$f_i=0$" and $\beta P^i_B$ and $\beta Q^i_B$ are calculated according to Equation 3. In this case, $P^i_B$ and $Q^i_B$ represent a change amount of initial active power and a change amount of initial reactive power, respectively.

A first case 610 shows that the first reference power 614 is located inside the boundary of the first FOR 612. In this case, the transmission grid operator may determine the first reference power 614 of the distribution grid as the final reference power. For example, the transmission grid operator may determine the final reference power ($P^i_{B,update}$, $Q^i_{B,update}$) of the distribution grid (No. i) according to Equation 4 and Equation 5.

$$\min\{(\Delta P^i_{B,update} - \Delta P^i_B)^2 + (\Delta Q^i_{B,update} - \Delta Q^i_B)^2\} \quad \text{[Equation 4]}$$

$$\text{s.t.} f_i(P^i_B + \Delta P^i_{B,update}, Q^i_B + \Delta Q^i_{B,update}) = 0 \quad \text{[Equation 5]}$$

Referring to Equation 4 and Equation 5, when the first reference power 614 is located within the boundary of the FOR determined by the distribution grid operator, $f_i(P^i_B + \beta P^i_B, Q^i_B + \beta Q^i_B)$ has a value of 0 or less. Accordingly, the transmission grid operator may determine that first reference power is the final reference power. In the meantime, although not shown in FIG. 6, even when the first reference power 614 is located on the boundary of the first FOR 612, the transmission grid operator may determine that the first reference power 614 of the distribution grid is the final reference power.

On the other hand, a second case 620 shows that the second reference power 624 is located outside the boundary of the second FOR 622. In this case, the transmission grid operator may determine, as the final reference power, a point 626, which minimizes a distance to the reference power 624, from among a plurality of points located on the boundary of the second FOR 622. For example, when the second reference power 624 is located outside the boundary of the FOR determined by the distribution grid operator, $f_i(P^i_B + \beta P^i_B, Q^i_B + \beta Q^i_B)$ has a value greater than zero. Accordingly, the transmission grid operator may determine, as the final reference power, the point 626 having a minimum distance to the reference power 624 and making $f_i$ to be zero ($f_i = 0$).

After determining the final reference power of the distribution grid (No. i), the transmission grid operator may determine the final reference power of a distribution grid (No. j). In this case, like the second case 620, the final reference power of the distribution grid (No. j) determined by the transmission grid operator may include residual power generated by determining the final reference power of the distribution grid (No. i). Additionally or alternatively, in a method of determining the final reference power such that the largest power difference (a difference between final reference power and initial power) is present in the most sensitive distribution grid operator among a plurality of distribution grid operators, the transmission grid operator may efficiently allocate power to the plurality of distribution grid operators. Here, like the distribution grid operator (No. 3) in FIG. 5, the 'most sensitive' distribution grid operator may refer to an operator having the largest total power generation change amount according to any load change. On the other hand, when the distribution grid operator (No. j) is most sensitive, 'j' may be defined as in Equation 6 and Equation 7.

$$j = \arg\max_n \{(\Delta P^n_B)^2 + (\Delta Q^n_B)^2\} \quad \text{[Equation 6]}$$

$$\text{s.t.} f_j(P^j_B + \Delta P^j_B, Q^j_B + \Delta Q^j_B) < 0 \quad \text{[Equation 7]}$$

According to the above, the final reference power of the distribution grid operator (No. j) may be determined as the sum of the reference power calculated by Equation 3 and residual power generated from the distribution grid operator (No. i). However, as such, similarly to the second case 620, the final reference power including the residual power may be located outside the boundary of FOR of a distribution grid (No. j). In this case, the transmission grid operator may modify the final reference power of the distribution grid operator (No. j) as shown in Equation 4.

Meanwhile, the transmission grid operator may transmit the determined final reference power to the distribution grid operator. In this case, the distribution grid operator may determine the power generation amount of each of a plurality of generators based on a second power sensitivity parameter and the final reference power. First of all, the distribution grid operator may determine a reference power generation amount of each of a plurality of generators based on the second power sensitivity parameter. Then, the distribution grid operator may determine the power generation amount of each of a plurality of generators by comparing the reference power generation amount with the flexibility of each of a plurality of generators. Here, a method in which the distribution grid operator determines the power generation amount of each of a plurality of generators may be performed similarly to a method in which the transmission grid operator determines the final reference power of each of a plurality of distribution grids. That is, the transmission grid operator, the distribution grid, and the final reference power of FIG. 6 may be interpreted after being replaced with a distribution grid operator, a generator, and a power generation amount, respectively.

Figure 7:
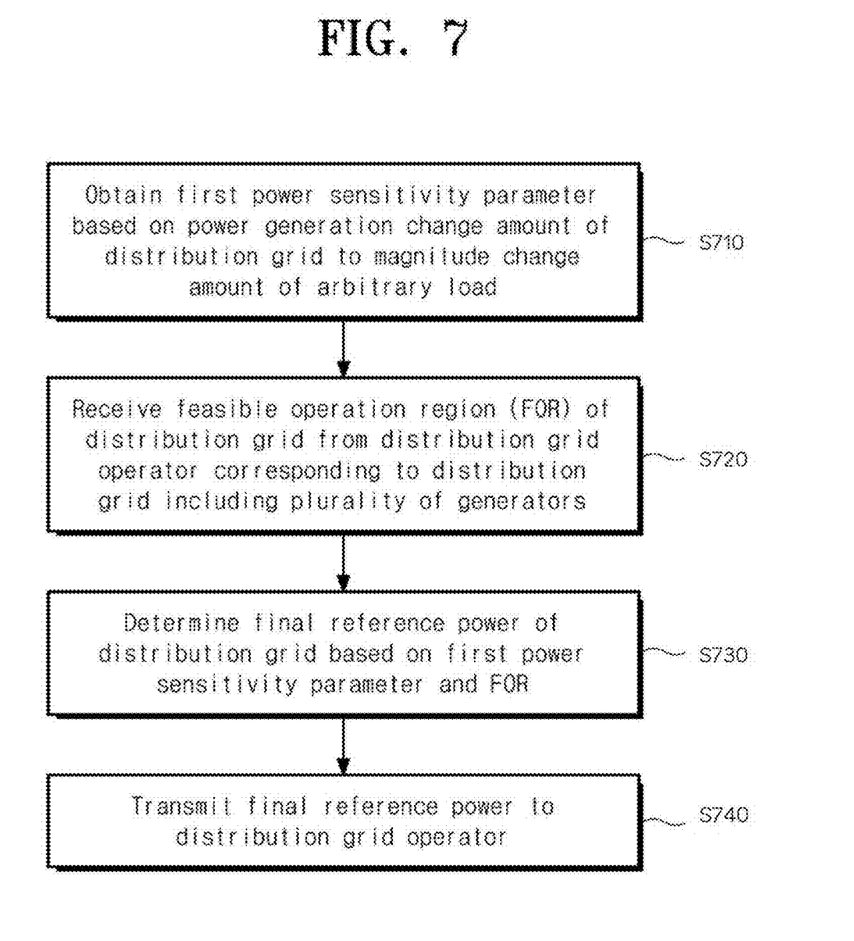
FIG. 7 shows an example of a method for cooperatively controlling power based on power sensitivity, according to an embodiment of the present disclosure.

FIG. 7 shows an example of a method 700 for cooperatively controlling power based on power sensitivity, according to an embodiment of the present disclosure. The power controlling method 700 of the present disclosure may be performed by a processor (e.g., the processor 314 or 334) of each of a transmission grid operating device (or operator) and/or a distribution grid operating device (or operator). The power controlling method 700 may start with operation S710 of obtaining a first power sensitivity parameter based on a power generation change amount of a distribution grid to a magnitude change amount of an arbitrary load.

According to an embodiment, a processor may receive FOR of the distribution grid from a distribution grid operator corresponding to a distribution grid including a plurality of generators (S720). Then, the processor may determine final reference power for the distribution grid based on the first power sensitivity parameter and the FOR (S730). For example, the processor may calculate the reference power of the distribution grid by using the first power sensitivity parameter on a boundary bus of the distribution grid and may determine the final reference power of the distribution grid by comparing the FOR with the reference power.

According to an embodiment, when the reference power is located on the boundary of the FOR or within the boundary of the FOR, the processor may determine that the reference power is the final reference power of the distribution grid. Additionally or alternatively, when the reference power is located outside the boundary of the FOR, the processor may determine, as the final reference power, a point, which minimizes a distance to the reference power, from among a plurality of points on the boundary of the FOR.

According to an embodiment, the processor may transmit the final reference power to the distribution grid operator (S740). Afterward, the distribution grid operator may determine the power generation amount of each of a plurality of generators based on a second power sensitivity parameter and the final reference power. Here, the second power sensitivity parameter may be based on the power generation change amount of each of a plurality of generators to a magnitude change amount of an arbitrary load.

Hereinafter, an experimental example implementing the cooperative power controlling method based on the power sensitivity is disclosed according to an embodiment of the present disclosure.

Experimental Example

The performance of the cooperative power controlling method based on power sensitivity proposed in this disclosure has implemented in IEEE 39-bus including four distribution grid operators composed of a modified IEEE 33-bus radial distribution system (See FIG. 4). In detail, the IEEE 39-bus test system includes 39 buses, 10 generators, and 19 loads. Here, the total load is 6097+j1409 MVA. In addition, four distribution grid operators are connected to the boundary buses (No. 2, No. 9, No. 17, and No. 22) and the distribution grid operator includes 33 buses, 3 DGs, and 32 loads. Here, the three generators are arranged on the buses (No. 2, No. 22, and No. 33) of a distribution grid operator, respectively.

First of all, a load variation experiment has performed to verify the effectiveness of the power controlling method of the present disclosure. On a bus (No. 15), the actual load power has doubled from 320 MW to 640 MW in 10 seconds.

Figure 8:
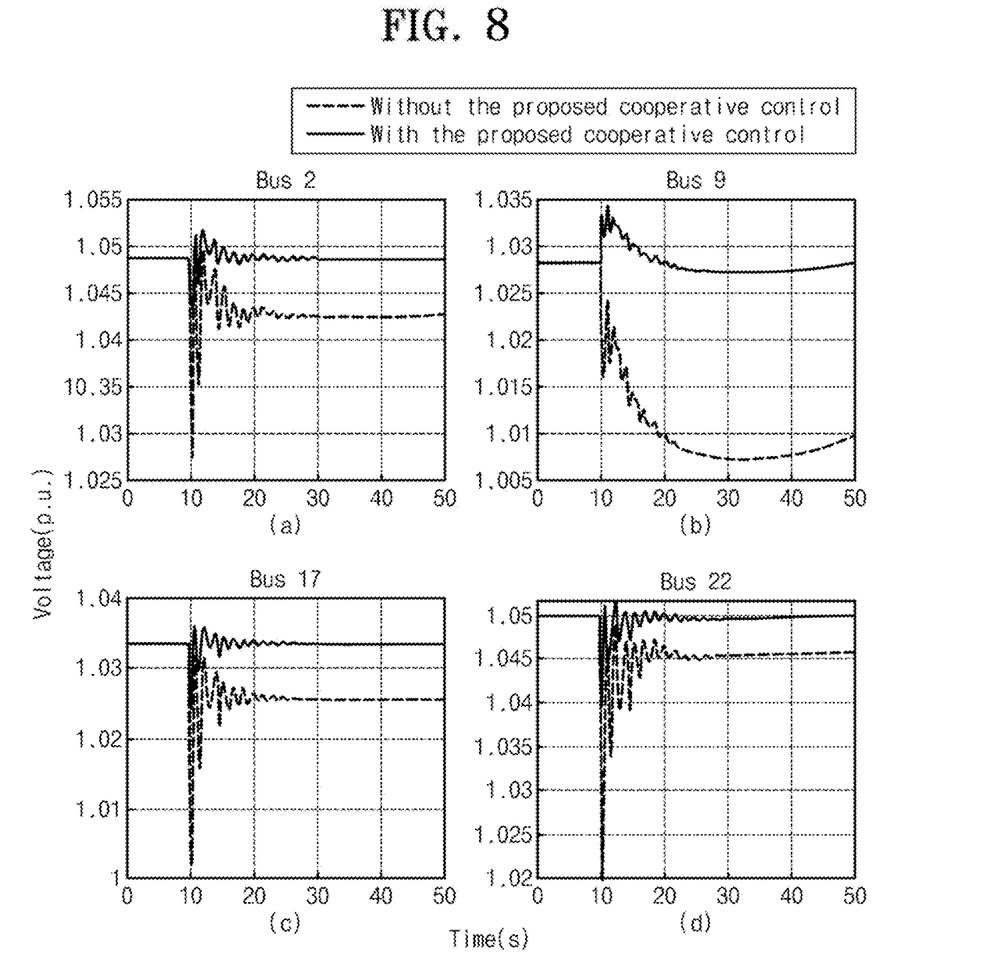
FIG. 8 shows voltage responses on Bus 2, Bus 9, Bus 17, and Bus 22 of four distribution grid operators, respectively.

FIG. 8 shows voltage responses on the boundary buses (No. 2, No. 9, No. 17, and No. 22) of four distribution grid operators, respectively. Referring to FIG. 8, it may be seen that a voltage is restored to an initial value after a load magnitude is changed. That is, according to the cooperative power controlling method of the present disclosure, it may be seen that voltage stability is maintained in both a transmission grid operator system and a distribution grid operator system.

Figure 9:
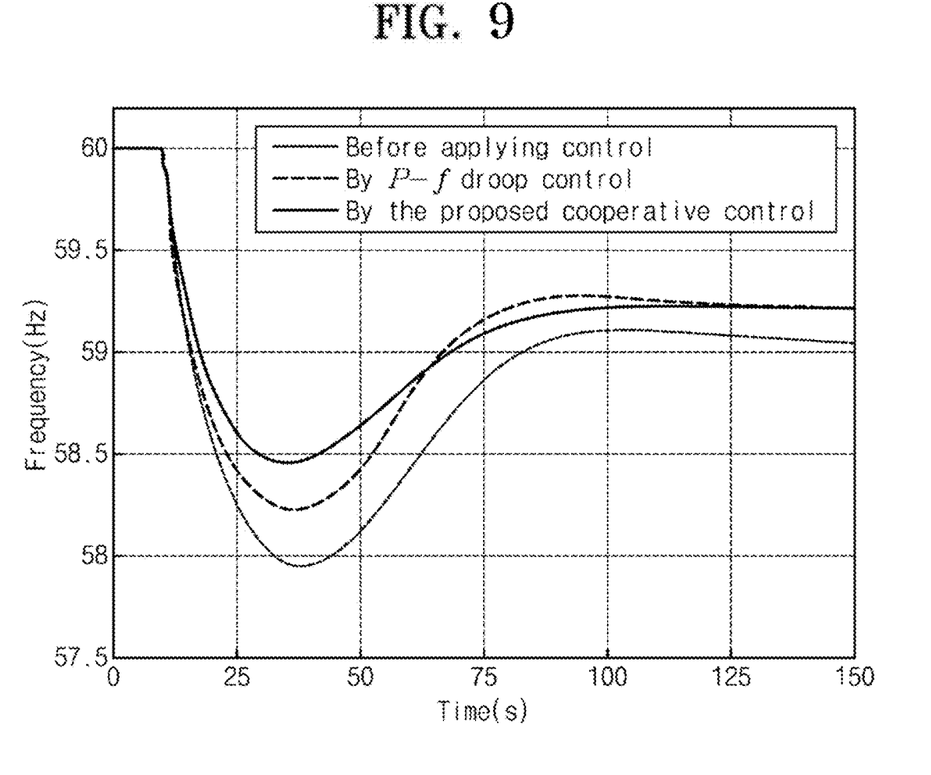
FIG. 9 shows the result of comparing the frequency response of P-fdroop and the frequency response of the cooperative power controlling method of the present disclosure.

FIG. 9 shows the result of comparing the frequency response of P-fdroop, which is a conventional power controlling method, and the frequency response of the cooperative power controlling method of the present disclosure. Here, the total amount of power generated by generators in both the methods is the same. Unlike the cooperative power controlling method, in P-fdroop, the same power generation amount has allocated to all generators. Referring to FIG. 9, it may be seen that the minimum value of a frequency in the cooperative power controlling method is higher than that in P-fdroop. In other words, it may be seen that the dynamic frequency response has more improved results in the case of the cooperative power controlling method rather than the conventional method. The reason is that a distribution grid operator optimizes a plurality of generators with high power sensitivity in a cooperative power controlling method, and thus the generators produce more power in the cooperative power controlling method.

TABLE 1

POWER OUTPUTS FROM GENERATORS IN TSO SYSTEM

| Generator | Base case [MW] | P-f droop control [MW] | Proposed cooperative control [MW] |
|---|---|---|---|
| G1 | 1055 | 1039 | 1043 |
| G2 | 598 | 597 | 534 |
| G3 | 684 | 683 | 683 |
| G4 | | disconnected | |
| G5 | 513 | 512 | 512 |
| G6 | 684 | 683 | 683 |
| G7 | 598 | 597 | 597 |
| G8 | 598 | 597 | 597 |
| G9 | 854 | 853 | 853 |
| G10 | 471 | 454 | 469 |
| Total | 6053 | 6014 | 5971 |

Table 1 shows power output from a synchronous generator of a transmission grid operator system. Referring to Table 1, it may be seen that the burden on the transmission grid operator to mitigate frequency fluctuations is reduced considering that the total amount of power generated by the generators in both the methods is the same.

The previous description of the present disclosure is provided to enable those skilled in the art to make or use the present disclosure. Various modifications of the present disclosure will be easily apparent to those skilled in the art, and the generic principles defined herein may be applied to various modifications without departing from the spirit or scope of the present disclosure. Accordingly, the present disclosure is not intended to be limited to the examples set forth herein, but is to be accorded the widest scope consistent with the principles and novel features disclosed herein.

Although example implementations may refer to utilizing aspects of the presently disclosed subject matter in the context of one or more standalone computer systems. However, the subject matter is not so limited, but rather may be implemented in connection with any computing environment, such as a network or a distributed computing environment. Furthermore, the aspects of the presently disclosed subject matter may be implemented in or across a plurality of processing chips or devices, and the storage may be similarly affected across a plurality of devices.

Although the present disclosure has been described herein in connection with some embodiments, it should be understood that various modifications and changes may be made without departing from the scope of the present disclosure as understood by those skilled in the art to which the present disclosure pertains. Moreover, such modifications and variations are intended to fall within the scope of claims appended hereto.

According to some embodiments of the present disclosure, voltage stability may be maintained in both a transmission grid operator system and a distribution grid operator system.

According to some embodiments of the present disclosure, in a cooperative power controlling method, the distribution grid operator may optimize a plurality of generators with high power sensitivity. As a result, generators produce more power in the cooperative power controlling method, thereby improving dynamic frequency response.

According to some embodiments of the present disclosure, the burden on a transmission grid operator may be reduced to mitigate frequency fluctuations.

While the present disclosure has been described with reference to embodiments thereof, it will be apparent to those of ordinary skill in the art that various changes and

What is claimed is:

1. A method of cooperatively controlling power based on power sensitivity, the method executed by at least one processor comprising:
   obtaining a first power sensitivity parameter based on a power generation change amount of a distribution grid to a magnitude change amount of an arbitrary load;
   receiving a feasible operation region (FOR) of the distribution grid from a distribution grid operator corresponding to the distribution grid including a plurality of generators;
   determining final reference power of the distribution grid based on the first power sensitivity parameter and the FOR; and
   transmitting the final reference power to the distribution grid operator,
   wherein the distribution grid operator determines a power generation amount of each of the plurality of generators based on a second power sensitivity parameter and the final reference power,
   wherein the second power sensitivity parameter is based on a power generation change amount of each of the plurality of generators to a magnitude change amount of an arbitrary load,
   wherein each of the plurality of generators generates power according to the power generation amount determined by the distribution grid operator.

2. The method of claim 1, wherein the determining of the final reference power of the distribution grid based on the first power sensitivity parameter and the FOR includes:
   calculating reference power of the distribution grid by using the first power sensitivity parameter in a boundary bus of the distribution grid; and
   determining the final reference power of the distribution grid by comparing the FOR with the reference power.

3. The method of claim 2, wherein the determining of the final reference power of the distribution grid by comparing the FOR and the reference power includes:
   when the reference power is located on the boundary of the FOR or within the boundary of the FOR, determining that the reference power is the final reference power of the distribution grid.

4. The method of claim 2, wherein the determining of the final reference power of the distribution grid by comparing the FOR and the reference power includes:
   when the reference power is located outside the boundary of the FOR, determining a point, which minimizes a distance to the reference power, from among a plurality of points on the boundary of the FOR as the final reference power.

5. A computer-readable non-transitory recording medium storing a program for executing a method of cooperatively controlling power based on power sensitivity described in claim 1.

6. An apparatus for cooperatively controlling power based on power sensitivity, the apparatus comprising:
   a memory configured to store at least one of a first power sensitivity parameter that is based on a power generation change amount of a distribution grid to a magnitude change amount of an arbitrary load, FOR of the distribution grid including a plurality of generators, and final reference power of the distribution grid;
   a communication module configured to receive the FOR from a distribution grid operator corresponding to the distribution grid and to transmit the final reference power to the distribution grid; and
   at least one processor connected to the memory and configured to execute computer-readable instructions stored in the memory,
   wherein the instructions causes the processor to:
      obtain the first power sensitivity parameter;
      receive the FOR from the distribution grid operator;
      determine the final reference power of the distribution grid based on the first power sensitivity parameter and the FOR; and
      transmit the final reference power to the distribution grid operator,
   wherein the distribution grid operator determines a power generation amount of each of the plurality of generators based on a second power sensitivity parameter and the final reference power,
   wherein the second power sensitivity parameter is based on a power generation change amount of each of the plurality of generators to a magnitude change amount of an arbitrary load,
   wherein each of the plurality of generators generates power according to the power generation amount determined by the distribution grid operator.

* * * * *